US012676691B2

(12) United States Patent　　　(10) Patent No.:　US 12,676,691 B2

Doerr et al.　　　　　　　　　　　(45) Date of Patent:　　Jul. 7, 2026

(54) OPTICAL MULTI-WAVELENGTH DUAL-POLARIZATION TRANSCEIVERS

(71) Applicant: Aloe Semiconductor, Inc., Middletown, NJ (US)

(72) Inventors: Christopher R. Doerr, Middletown, NJ (US); Ying Zhao, Holmdel, NJ (US)

(73) Assignee: Aloe Semiconductor Inc., Middletown, NJ (US)

( * ) Notice: Subject to any disclaimer, the term of this patent is extended or adjusted under 35 U.S.C. 154(b) by 130 days.

(21) Appl. No.: 18/205,675

(22) Filed: Jun. 5, 2023

(65) Prior Publication Data

US 2023/0396351 A1　　Dec. 7, 2023

Related U.S. Application Data

(60) Provisional application No. 63/349,017, filed on Jun. 3, 2022.

(51) Int. Cl.
| | |
|---|---|
| *H04B 10/60* | (2013.01) |
| *H04B 10/40* | (2013.01) |
| *H04B 10/50* | (2013.01) |
| *H04B 10/532* | (2013.01) |
| *H04B 10/54* | (2013.01) |
| *H04J 14/02* | (2006.01) |
| *H04J 14/06* | (2006.01) |

(Continued)

(52) U.S. Cl.
CPC .......... *H04J 14/0209* (2013.01); *H04B 10/40* (2013.01); *H04B 10/5053* (2013.01); *H04B 10/532* (2013.01); *H04B 10/54* (2013.01); *H04J 14/0213* (2013.01); *H04J 14/06* (2013.01); *G02B 6/2935* (2013.01); *H04B*

*10/60* (2013.01); *H04B 10/614* (2013.01); *H04J 14/00* (2013.01); *H04J 14/02* (2013.01)

(58) Field of Classification Search
CPC .... H04J 14/0209; H04J 14/0213; H04J 14/06; H04J 14/00; H04J 14/02; H04B 10/40; H04B 10/5053; H04B 10/532; H04B 10/54; H04B 10/614; H04B 10/60; G02B 6/2935; G02B 6/126; G02B 6/2753; G02B 6/2793
USPC ................................... 398/43–103, 202–214
See application file for complete search history.

(56) References Cited

U.S. PATENT DOCUMENTS

| | | | |
|---|---|---|---|
| 2009/0154928 A1* | 6/2009 | Shin ................... | G02B 6/12016 398/79 |
| 2010/0086307 A1* | 4/2010 | Mitchell ............. | H04J 14/0307 398/79 |

(Continued)

*Primary Examiner* — Dibson J Sanchez

(74) *Attorney, Agent, or Firm* — Fish & Richardson P.C.

(57) ABSTRACT

A multi-wavelength dual-polarization (DP) receiver includes an input port configured to receive input light; an optical polarization splitter and rotator configured to split the input light into a first optical waveguide and a second optical waveguide; a first wavelength demultiplexer connected to the first optical waveguide and configured to output wavelength-demultiplexed light into a first plurality of optical waveguides; a second wavelength demultiplexer connected to the second optical waveguide and configured to output wavelength-demultiplexed light into a second plurality of optical waveguides; and a plurality of optical multi-input-multi-output (MIMO) polarization demultiplexers, each of which is connected to a respective one of the first plurality of optical waveguides and one of the second plurality of optical waveguides.

14 Claims, 9 Drawing Sheets

Multi-wavelength DP receiver

(51) Int. Cl.
G02B 6/293 (2006.01)
H04B 10/61 (2013.01)
H04J 14/00 (2006.01)

(56) References Cited

U.S. PATENT DOCUMENTS

| | | | |
|---|---|---|---|
| 2010/0098411 A1 | 4/2010 | Nakashima et al. | |
| 2010/0329679 A1* | 12/2010 | Little | H04J 14/0305 |
| | | | 398/79 |
| 2011/0243556 A1* | 10/2011 | Nagarajan | H04J 14/06 |
| | | | 398/43 |
| 2013/0108270 A1 | 5/2013 | Zhang et al. | |
| 2013/0322881 A1 | 12/2013 | Vacondio et al. | |
| 2015/0131996 A1 | 5/2015 | Izumi | |
| 2017/0285373 A1* | 10/2017 | Zhang | G02B 6/29302 |
| 2018/0059332 A1* | 3/2018 | Mansouri Rad | G02B 6/12004 |
| 2019/0041594 A1* | 2/2019 | Li | H01L 24/14 |
| 2019/0179064 A1* | 6/2019 | Zhang | G01S 7/4817 |
| 2020/0007263 A1 | 1/2020 | Cavaliere et al. | |
| 2020/0319409 A1* | 10/2020 | Su | H04J 14/0209 |
| 2021/0135762 A1* | 5/2021 | Zhou | H04B 10/5561 |
| 2022/0045766 A1* | 2/2022 | Le | H04B 10/07951 |
| 2023/0344546 A1* | 10/2023 | Maharry | H04B 10/614 |
| 2023/0396351 A1 | 12/2023 | Doerr et al. | |
| 2024/0214105 A1 | 6/2024 | Suzuki et al. | |

* cited by examiner

OPTICAL MULTI-WAVELENGTH DUAL-POLARIZATION TRANSCEIVERS

CROSS-REFERENCE TO RELATED APPLICATIONS

This application claims the benefit of an earlier filing date and right of priority to U.S. Provisional Application No. 63/349,017, filed on Jun. 3, 2022, the disclosure of which is incorporated herein by reference in its entirety.

TECHNICAL FIELD

The present disclosure generally relates to optical transceivers and demultiplexers.

BACKGROUND

In optical communication systems, multiplexing techniques, such as wavelength-division multiplexing (WDM) or polarization-division multiplexing (PDM), can increase communication capacity and/or photon efficiency by multiplexing different signals over different channels for simultaneous transmission through a single fiber.

SUMMARY

Various implementations are disclosed herein that relate to multi-wavelength dual-polarization (DP) optical transceivers and demultiplexers. It should be appreciated that various aspects of these different implementations may be modified, combined, and/or used interchangeably within the scope of this disclosure.

In one aspect, a multi-wavelength dual-polarization (DP) receiver includes an input port configured to receive input light; an optical polarization splitter and rotator configured to split the input light into a first optical waveguide and a second optical waveguide; a first wavelength demultiplexer connected to the first optical waveguide and configured to output wavelength-demultiplexed light into a first plurality of optical waveguides; a second wavelength demultiplexer connected to the second optical waveguide and configured to output wavelength-demultiplexed light into a second plurality of optical waveguides; and a plurality of optical multi-input-multi-output (MIMO) polarization demultiplexers, each of which is connected to a respective one of the first plurality of optical waveguides and one of the second plurality of optical waveguides. Implementations can include one or more of the following. The multi-wavelength DP receiver, further including at least one variable optical attenuator (VOA) connected to the outputs of the first wavelength demultiplexer and/or the second wavelength demultiplexer. The multi-wavelength DP receiver, wherein the optical polarization splitter and rotator, the first and second wavelength demultiplexers, and the plurality of optical MIMO polarization demultiplexers are all implemented on the same chip. The multi-wavelength DP receiver, wherein the chip has a silicon substrate. The multi-wavelength DP receiver, wherein path lengths from the input port to inputs of the plurality of optical MIMO polarization demultiplexers are within 0.2 mm of each other. The multi-wavelength DP receiver, wherein the multi-wavelength DP receiver is co-packaged with a digital-signal processor. The multi-wavelength DP receiver, further including taps and monitor photodiodes that are implemented on outputs of at least one of the plurality of optical MIMO polarization demultiplexers. The multi-wavelength DP receiver, wherein the first and second wavelength demultiplexers have wavelengths that are electronically adjustable. The multi-wavelength DP receiver, further including a transimpedance amplifier that is integrated into the chip. The multi-wavelength DP receiver, wherein electronic control for the plurality of optical MIMO polarization demultiplexers is integrated into the chip. The multi-wavelength DP receiver, further including a Stokes measurement apparatus that is integrated on the same chip. The multi-wavelength DP receiver, wherein the first wavelength demultiplexer outputs a first plurality of wavelength-demultiplexed light signals of N wavelengths into the first plurality of optical waveguides, wherein the second wavelength demultiplexer outputs a second plurality of wavelength-demultiplexed light signals of the N wavelengths into the second plurality of optical waveguides, and wherein an ordering of the N wavelengths for the first plurality of wavelength-demultiplexed light signals that are output from the first wavelength demultiplexer and an ordering of the N wavelengths for the second plurality of wavelength-demultiplexed light signals that are output from the second wavelength demultiplexer are in an opposite order. The multi-wavelength DP receiver, wherein at least one of the N wavelengths has no waveguide crossings among the first plurality of optical waveguides and the second plurality of optical waveguides. The multi-wavelength DP receiver, further including a plurality of photodetectors connected to respective outputs of the plurality of optical MIMO polarization demultiplexers.

In another aspect, a multi-wavelength dual-polarization (DP) receiver includes an input port configured to receive input light; an optical polarization splitter and rotator configured to split the input light into a first optical waveguide and a second optical waveguide; a serial wavelength demultiplexer connected to the first optical waveguide and to the second optical waveguide and configured to output wavelength-demultiplexed light into a plurality of optical waveguides; a plurality of optical multi-input-multi-output (MIMO) polarization demultiplexers connected to the plurality of optical waveguides; and a plurality of photodetectors connected to respective outputs of the plurality of optical MIMO polarization demultiplexers.

In another aspect, a method of receiving a multi-wavelength dual-polarization (DP) signal includes: performing polarization splitting on the multi-wavelength DP signal to generate a first optical signal and a second optical signal; performing wavelength-demultiplexing on the first optical signal and the second optical signal to generate a plurality of wavelength-demultiplexed optical signals; performing differential attenuation on the plurality of wavelength-demultiplexed optical signals; and performing polarization demultiplexing on the differentially attenuated plurality of wavelength-demultiplexed optical signals.

In another aspect, a multi-wavelength dual polarization (DP) transmitter includes two lasers with a wavelength difference that is less than 15 nm. Implementations can include one or more of the following. The multi-wavelength DP transmitter, wherein the two lasers are electro-absorption-modulated lasers (EMLs). The multi-wavelength DP transmitter, further including a polarization combiner that is configured to combine outputs of the two lasers.

The details of one or more implementations of the subject matter of this disclosure are set forth in the accompanying drawings and the description below. Other features, aspects, and advantages of the subject matter will become apparent from the description, the drawings, and the claims.

DETAILED DESCRIPTION

In a dual-polarization (DP) communication system, two signals are multiplexed and transmitted using the two different polarization modes of light, thereby doubling the data capacity. The receiver performs polarization demultiplexing to separate the two signals in the two polarization modes, thereby recovering the data transmitted in each of the two signals.

Data capacity can be further increased by using multiple wavelengths, where each wavelength carries a DP signal. Therefore, by using a combination of wavelength-division-multiplexing (WDM) and dual-polarization (DP), an optical communication system can transmit information using N wavelengths in two polarization modes, thereby enabling transmission of 2N times the capacity as compared to using a single wavelength in a single polarization mode.
Dual-Polarization Multi-Wavelength Receivers To receive a multi-wavelength DP signal, an optical receiver performs demultiplexing of the multiple wavelengths and also demultiplexing of the two polarization modes in each wavelength. In particular, transmission through a non-polarization-maintaining optical fiber typically results in mixing of the two polarization modes, which should be demultiplexed using a multiple-input multiple-output (MIMO) demultiplexing receiver.

Implementations disclosed herein can enable an efficient and practical way to combine wavelength demultiplexing and polarization MIMO demultiplexing on a single photonic chip. Transimpedance amplifiers (TIAs) can also be integrated onto the photonic chip. In some scenarios, the photonic chip can be co-packaged with a signal-processing chip.

Figure 1:
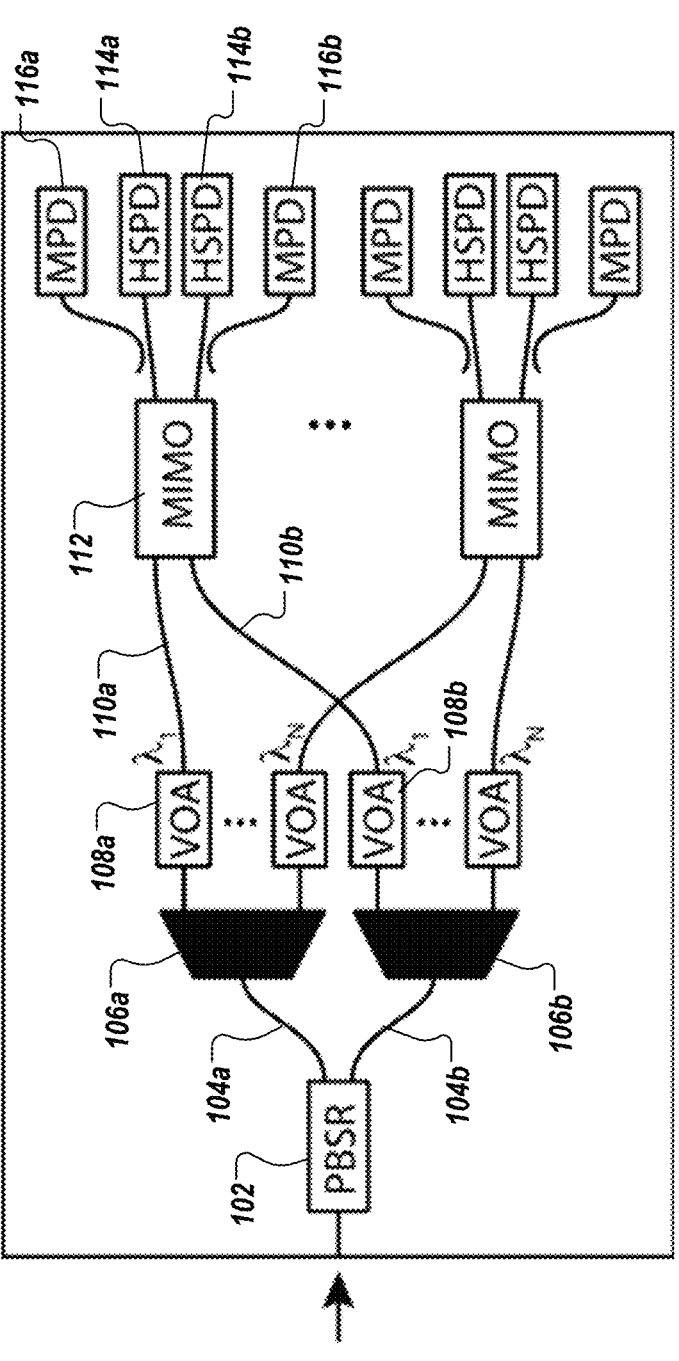
FIG. 1 illustrates an example of a multi-wavelength dual-polarization (DP) receiver, according to implementations of the present disclosure.
Figure 2:
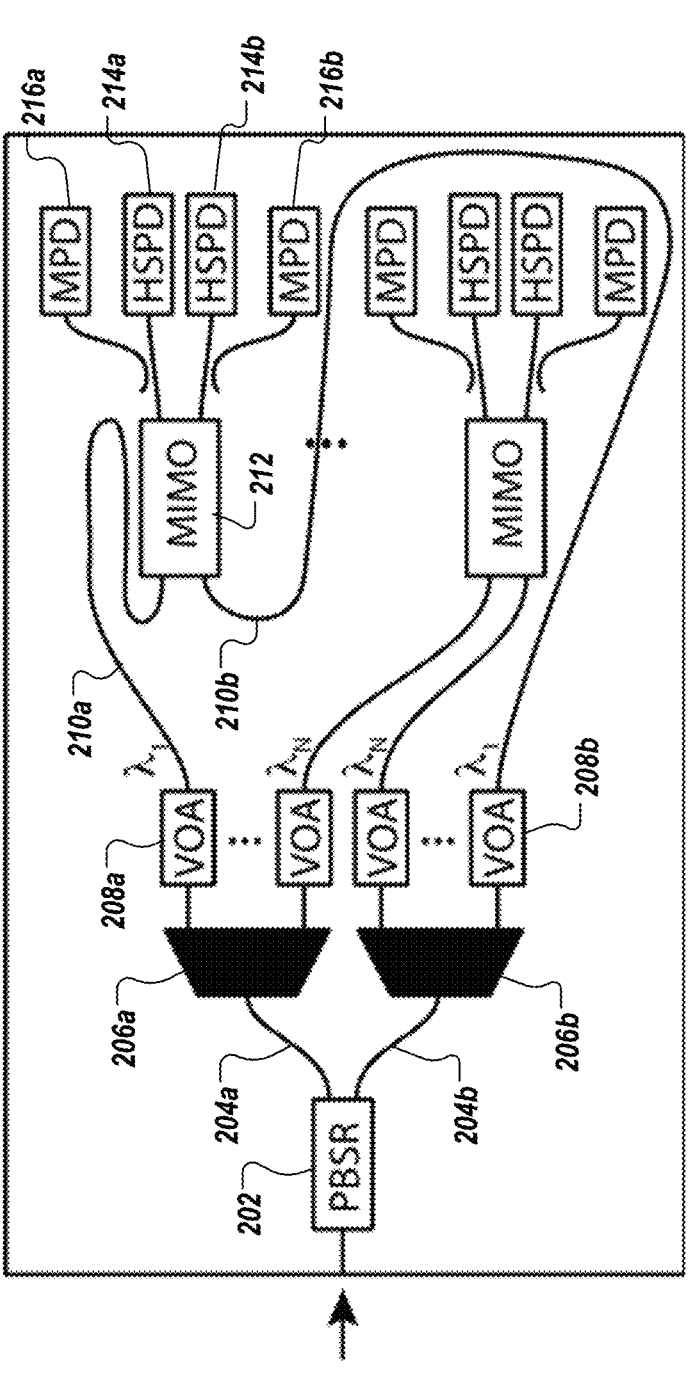
FIG. 2 illustrates another example of a multi-wavelength DP receiver, according to implementations of the present disclosure.

FIGS. 1 and 2 are diagrams illustrating examples of DP multi-wavelength receivers. FIG. 1 shows an example of a receiver 100 with waveguide crossings. In some scenarios, such waveguide crossings can create loss and crosstalk. FIG. 2, by contrast, shows an example of a receiver 200 in which crossings are avoided by routing some waveguides around the photodiodes, and in which one wavelength demultiplexer has a reverse ordering of outputs as the other wavelength demultiplexer.

In these examples, a polarization splitter, such as a polarization-beam splitter/combiner and rotator (PBSR) (102, 202), splits an incoming DP multi-wavelength signal into the two polarization modes which are guided into two separate waveguides (104a, 104b and 204a, 204b), where the polarizations are adjusted to be the same in the two waveguides. Each of the two polarization portions passes through a respective wavelength demultiplexer (106a, 106b and 206a, 206b). At the output of each wavelength demultiplexer (106a, 106b and 206a, 206b), the wavelength portions are demultiplexed into N separate waveguides. The wavelength demultiplexers (106a, 106b and 206a, 206b) can be electronically adjustable to account for temperature and signal wavelength changes. As a result, there are a total of N pairs of waveguides (2N total waveguides).

At least one variable optical attenuator (VOA) can be connected to at least one of each pair of waveguides that are output from the wavelength demultiplexers. For example, in FIG. 1, a first pair of waveguides (corresponding to the 2 polarization modes for the first wavelength $\lambda_1$) connects to VOAs 108a and 108b, respectively. As another example, in FIG. 2, a first pair of waveguides (corresponding to the 2 polarization modes for the first wavelength $\lambda_1$) connects to VOAs 208a and 208b, respectively. Similarly, the other N−1 pairs of waveguides (corresponding to the other N−1 wavelengths $\lambda_2, \lambda_2 \ldots \lambda_N$) can be connected to respective VOAs. The VOAs are used to equalize the losses for the two polarization portions from the optical fiber to the outputs of the demultiplexers. These VOAs can be static or can be dynamically adjusted. In some implementations, optional optical filters can be included to further attenuate any unwanted wavelength portions in the wavelength-demultiplexed portions.

It should be noted that in FIG. 2, the outputs of the first the second wavelength demultiplexers 206a and 206b are in reverse order. In particular, the outputs of the first wavelength demultiplexer 206a are ordered as wavelengths $\lambda_1 \ldots \lambda_N$ from top to bottom, whereas the outputs of the second wavelength demultiplexer 206b are ordered as wavelengths $\lambda_N \ldots \lambda_1$ from top to bottom (i.e., the mirror image of the outputs of the first wavelength demultiplexer 206a). This reverse ordering in FIG. 2 is one feature that enables the receiver 200 of FIG. 2 to avoid crossings between waveguides, unlike the receiver 100 of FIG. 1 in which the both the first and second wavelength demultiplexers 106a and 106b have the same ordering of outputs.

Each pair of waveguides that are output from the VOAs then connects to a respective 2×2 MIMO polarization demultiplexer. For example, in FIG. 1, the first pair of waveguides (110a, 110b) corresponding to the 2 polarization modes for the first wavelength $\lambda_1$ that are output from VOAs 108a and 108b, respectively, are connected to the first 2×2 MIMO polarization demultiplexer 112. As another example, in FIG. 2, the first pair of waveguides (210a, 210b) corresponding to the 2 polarization modes for the first wavelength $\lambda_1$ that are output from VOAs 208a and 208b, respectively, are connected to the first 2×2 MIMO polarization demultiplexer 212. Similarly, the other N−1 pairs of waveguides (corresponding to the other N−1 wavelengths $\lambda_2 \ldots \lambda_N$) can be connected to respective 2×2 MIMO polarization demultiplexers. These 2×2 MIMO polarization demultiplexers perform demultiplexing of the two original polarization signals from the two polarization portions. Each 2×2 MIMO polarization demultiplexer can be implemented using various techniques, as described further below with reference to FIGS. 7 and 8.

As seen in the example of FIG. 2, the "mirror image" ordering of outputs from the second wavelength demultiplexer 206*b* (and thus the ordering of inputs/outputs in the VOAs) and the arrangement of waveguides that connect the VOAs to the 2×2 MIMO polarization demultiplexers enable the receiver 200 to avoid crossing of waveguides. For example, the first pair of VOAs (208*a*, 208*b*) for the first pair of waveguides (which carry the two polarization modes of the first wavelength λ₁) are arranged so that the outgoing pair of waveguides (210*a*, 210*b*) can connect to the first 2×2 MIMO polarization demultiplexer 212 without crossing any of the other waveguides that connect other VOAs to respective 2×2 MIMO polarization demultiplexers. As discussed above, this feature of non-crossed waveguides is enabled by a suitable arrangement of waveguides, and also by the "mirror image" ordering of outputs from the second wavelength demultiplexer 206*b* as compared to the first wavelength demultiplexer 206*a*.

The outputs of the 2×2 MIMO polarization demultiplexers can be connected to high-speed photodiodes (HSPDs) for intensity-modulated direct-detection (IMDD) signal detection. For example, in FIG. 1, the outputs of the first 2×2 MIMO polarization demultiplexer 112 (where the outputs are the 2 demultiplexed polarization modes for the first wavelength λ₁) are connected to a pair of HSPDs 114*a* and 114*b* for direct detection. As another example, in FIG. 2, the outputs of the first 2×2 MIMO polarization demultiplexer 212 (where the outputs are the 2 demultiplexed polarization modes for the first wavelength λ₁) are connected to a pair of HSPDs 214*a* and 214*b* for direct detection. Similarly, the outputs of the other N−1 MIMO polarization demultiplexers (corresponding to the other N−1 wavelengths λ₂ . . . λ_N) can be connected to respective pairs of HSPDs.

In some implementations, optional optical taps are implemented on each MIMO output, which are connected to optional monitor photodiode (MPDs) for detecting markers or tone signals on the demultiplexed signals. Such markers or tone signals can be used to provide feedback for the controlling the 2×2 MIMO polarization demultiplexing. For example, in FIG. 1, the outputs of the first 2×2 MIMO polarization demultiplexer 112 (where the outputs are the 2 demultiplexed polarization modes for the first wavelength λ₁) have optical taps connected to MPDs 116*a* and 116*b*. As another example, in FIG. 2, the outputs of the first 2×2 MIMO polarization demultiplexer 212 (where the outputs are the 2 demultiplexed polarization modes for the first wavelength λ₁) have optical taps connected to MPDs 216*a* and 216*b*. Similarly, the outputs of the other N−1 MIMO polarization demultiplexers (corresponding to the other N−1 wavelengths λ₂ . . . λ_N) can have optical taps connected to respective MPDs. In some implementations, the path length from the PBSR (or from an input port of the receiver) to inputs of each of the N optical 2×2 MIMO polarization demultiplexer is the same. In some implementations, the path lengths from the PBSR (or from an input port of the receiver) to inputs of each of the N optical 2×2 MIMO polarization demultiplexers are within 0.2 mm of each other.

Figure 3:
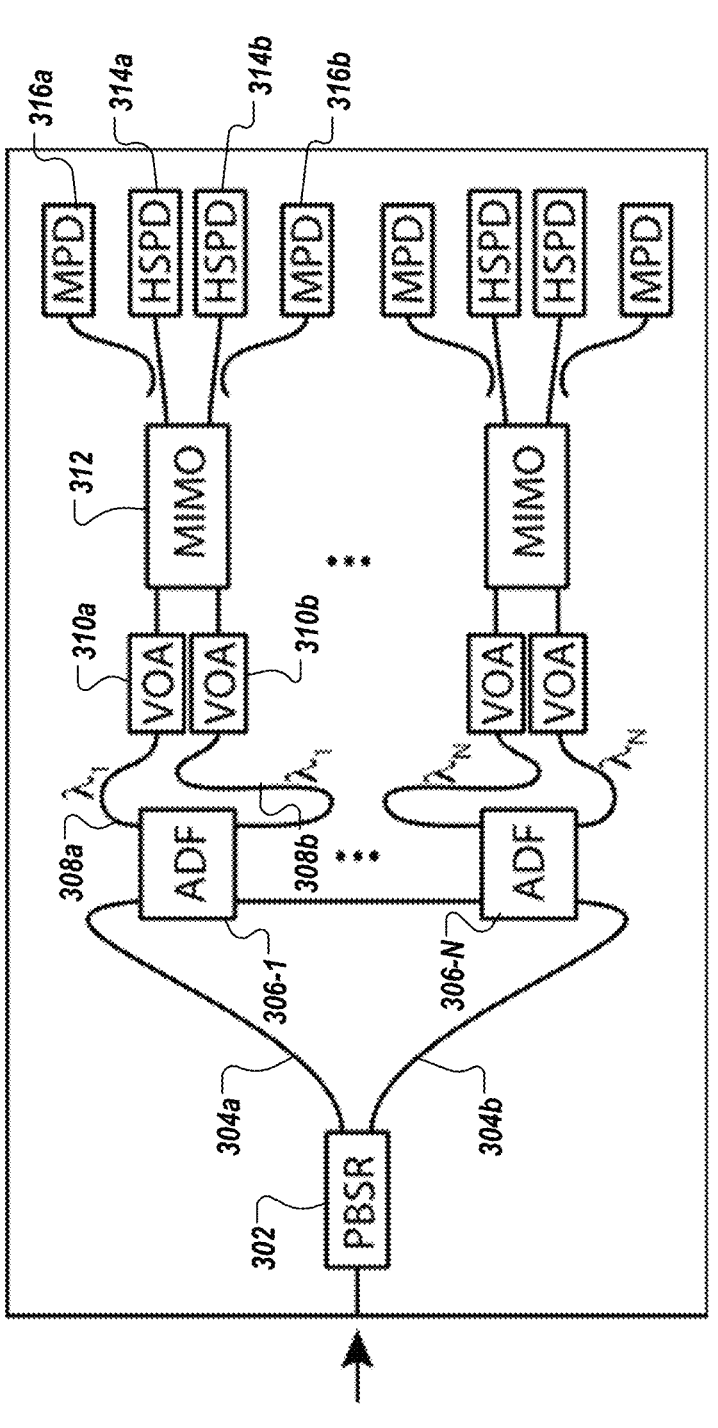
FIG. 3 illustrates another example of a multi-wavelength DP receiver, according to implementations of the present disclosure.

FIG. 3 shows an example of a multi-wavelength DP receiver using a bi-directional serial waveguide demultiplexer. In this example, the serial wavelength demultiplexer consists of a serial arrangement of add-drop filters (ADFs). The advantage of such a configuration is only one full wavelength demultiplexer is required, whereas the configurations of FIGS. 1 and 2 require two full wavelength demultiplexers. In the example of FIG. 3, a polarization splitter, such as PBSR 302, splits an incoming DP multi-wavelength signal into the two polarization modes which are guided into two separate waveguides (304*a*, 304*b*), where the polarizations are adjusted to be the same in the two waveguides. The waveguides (304*a*, 304*b*) are input into a series of ADFs, such as ADFs 306-1 through 306-N (corresponding to the N different wavelengths λ₁ . . . λ_N). The output of each ADF is a pair of waveguides that carry the two polarization modes of each wavelength. For example, the output of the first ADF 306-1 is a first pair of waveguides (308*a*, 308*b*) that carry the two polarization modes of the first wavelength λ₁. As discussed above, in some implementations, the path length from the PBSR (or from an input port of the receiver) to inputs of each of the N optical 2×2 MIMO polarization demultiplexer is the same. The total path length from the PBSR to the MIMO polarization demultiplexer can preferably be made equal for two paths for each channel. For example, in FIG. 3, the path including waveguide 304*a* plus waveguide 308*b* can have a total length that is equal to the total length of the path including waveguide 304*b* plus the series of interconnecting waveguides between ADFs 306-N to 306-1 plus the waveguide 308*a*.

At least one VOA can be connected to at least one of each pair of waveguides that are output from the ADFs. For example, the first pair of waveguides (308*a*, 308*b*) connects to VOAs 310*a* and 310*b*, respectively. Similarly, the other N−1 pairs of waveguides (corresponding to the other N−1 wavelengths λ₂ . . . λ_N) can be connected to respective VOAs. The VOAs are used to equalize the losses for the two polarization portions from the optical fiber to the outputs of the demultiplexers. These VOAs can be static or can be dynamically adjusted. In some implementations, optional optical filters can be included to further attenuate any unwanted wavelength portions in the wavelength-demultiplexed portions.

Each pair of waveguides that are output from the VOAs then connects to a respective 2×2 MIMO polarization demultiplexer. For example, the outputs of the first pair of VOAs 310*a* and 310*b* (which carry the two polarization modes of the first wavelength λ₁) are connected to the first 2×2 MIMO polarization demultiplexer 312. Similarly, the outputs of the other N−1 pairs of VOAs (corresponding to the other N−1 wavelengths λ₂, . . . λ_N) can be connected to respective 2×2 MIMO polarization demultiplexers. These 2×2 MIMO polarization demultiplexers perform demultiplexing of the two original polarization signals from the two polarization portions. Each 2×2 MIMO polarization demultiplexer can be implemented using various techniques, as described further below with reference to FIGS. 7 and 8. In some implementations, the 2×2 MIMO polarization demultiplexer has an "endless" property such that the polarization demultiplexing can adapt to random and unpredictable rotations and losses in received polarization, without requiring any resets of the phase-shifting that would interrupt signal reception.

The outputs of the 2×2 MIMO polarization demultiplexers can be connected to HSPDs for IMDD signal detection. For example, the outputs of the first 2×2 MIMO polarization demultiplexer 312 (where the outputs are the 2 demultiplexed polarization modes for the first wavelength λ₁) are connected to a pair of HSPDs 314*a* and 314*b* for direct detection. Similarly, the outputs of the other N−1 MIMO polarization demultiplexers (corresponding to the other N−1 wavelengths λ₂ . . . λ_N) can be connected to respective pairs of HSPDs.

In some implementations, optional optical taps are implemented on each MIMO output, which are connected to optional monitor photodiode (MPDs) for detecting markers or tone signals on the demultiplexed signals. Such markers or tone signals can be used to provide feedback for the controlling the 2×2 MIMO polarization demultiplexing. For example, the outputs of the first 2×2 MIMO polarization demultiplexer 312 (where the outputs are the 2 demultiplexed polarization modes for the first wavelength $\lambda_1$) have optical taps connected to MPDs 316a and 316b. Similarly, the outputs of the other N−1 MIMO polarization demultiplexers (corresponding to the other N−1 wavelengths $\lambda_2 \ldots \lambda_N$) can have optical taps connected to respective MPDs.

Implementations disclosed above can enable an efficient and practical way to perform both wavelength demultiplexing and polarization MIMO demultiplexing on a single photonic chip, which can have a silicon substrate. In some implementations, transimpedance amplifiers (TIAs) can also be integrated onto the photonic chip. The photonic chip can also be co-packaged with a signal-processing chip, for example, by co-packaging the multi-wavelength DP receiver with a digital-signal processor. In some implementations, electronic control for the optical MIMO polarization demultiplexers can be integrated into the same chip.

Dual-Laser Dual-Polarization Transmitter

According to various implementations, a dual polarization (DP) transmitter can implement either a single laser or two separate lasers.

Figures 4A, 4B:
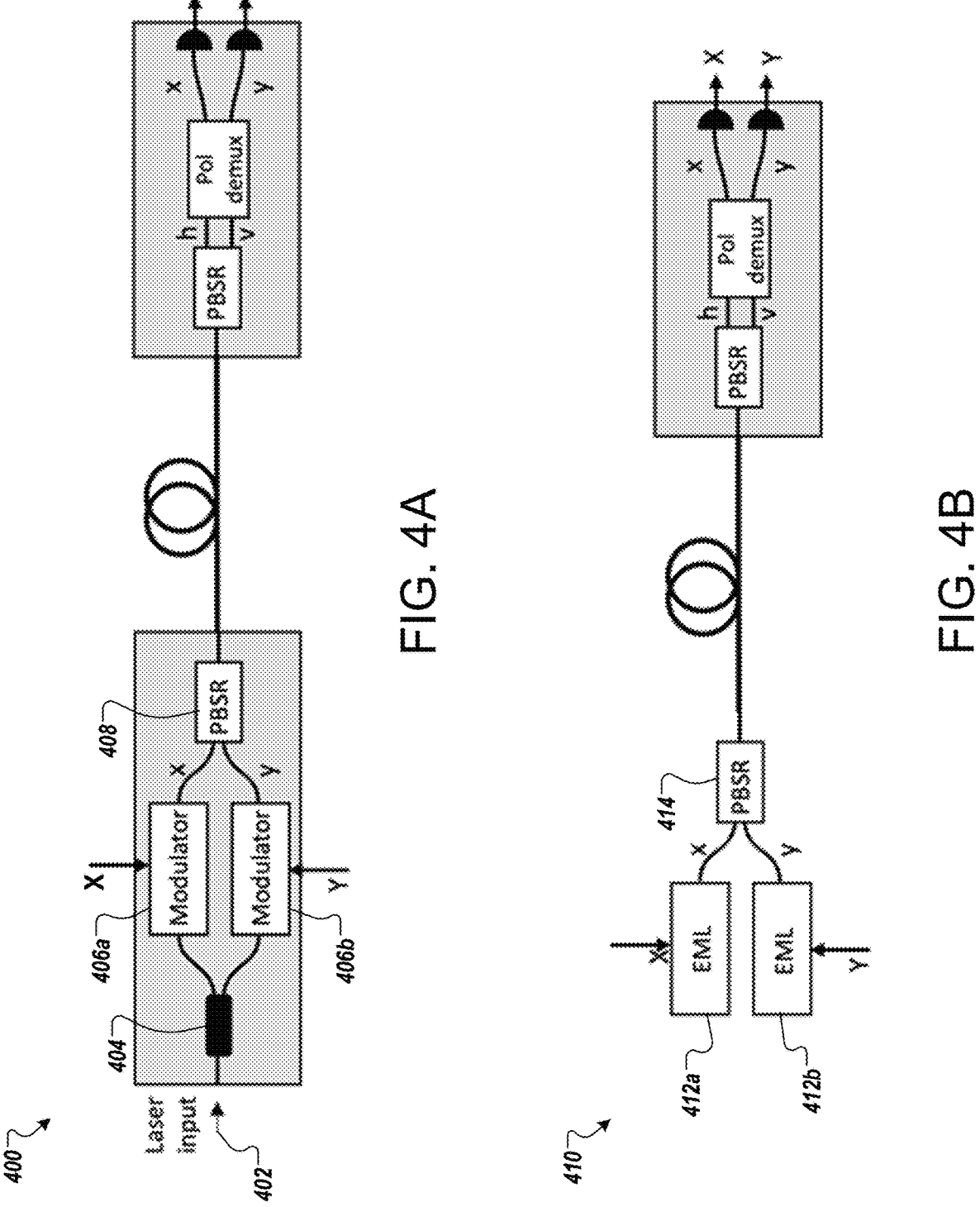
FIG. 4A illustrates an example of a DP link with a single-laser DP transmitter.
FIG. 4B illustrates an example of a DP link with a dual-laser DP transmitter, according to implementations of the present disclosure.

FIG. 4A illustrates an example of a DP link with a single-laser DP transmitter 400. In this example, a single continuous-wave (CW) laser input 402 is split by a splitter 404 into two modulators 406a and 406b which are modulated by respective inputs X and Y. The outputs of the modulators 406a and 406b are modulated optical signals (x and y) which are combined in a polarization-beam splitter/combiner and rotator (PBSR) 408 and transmitted over an optical fiber.

The example in FIG. 4A shows the modulators 406a and 406b implemented separately from the laser. However, in some scenarios, the modulators can be integrated with the laser, such as in an electro-absorption-modulated laser (EML), as shown in FIG. 4B. In such scenarios, a DP transmitter can be implemented by combining the outputs of two different EMLs in a PBSR.

FIG. 4B illustrates an example of a DP link with a dual-laser DP transmitter 410, according to implementations of the present disclosure. In this example, two separate EMLs 412a and 412b (with respective inputs X and Y) each generate modulated light signals (x and y) which are combined in PBSR 414 and transmitted over an optical fiber. In some implementations, the two EMLs 412a and 412b have wavelengths that are not identical but are close together, such as within about 10 nm of each other. In some implementations, markers such as low-frequency tones of different frequencies can be implemented in each EML to aid the receiver's polarization demultiplexer in demultiplexing. In some scenarios, the example of FIG. 4B can also be extended to a multi-wavelength implementation.

Figure 5:
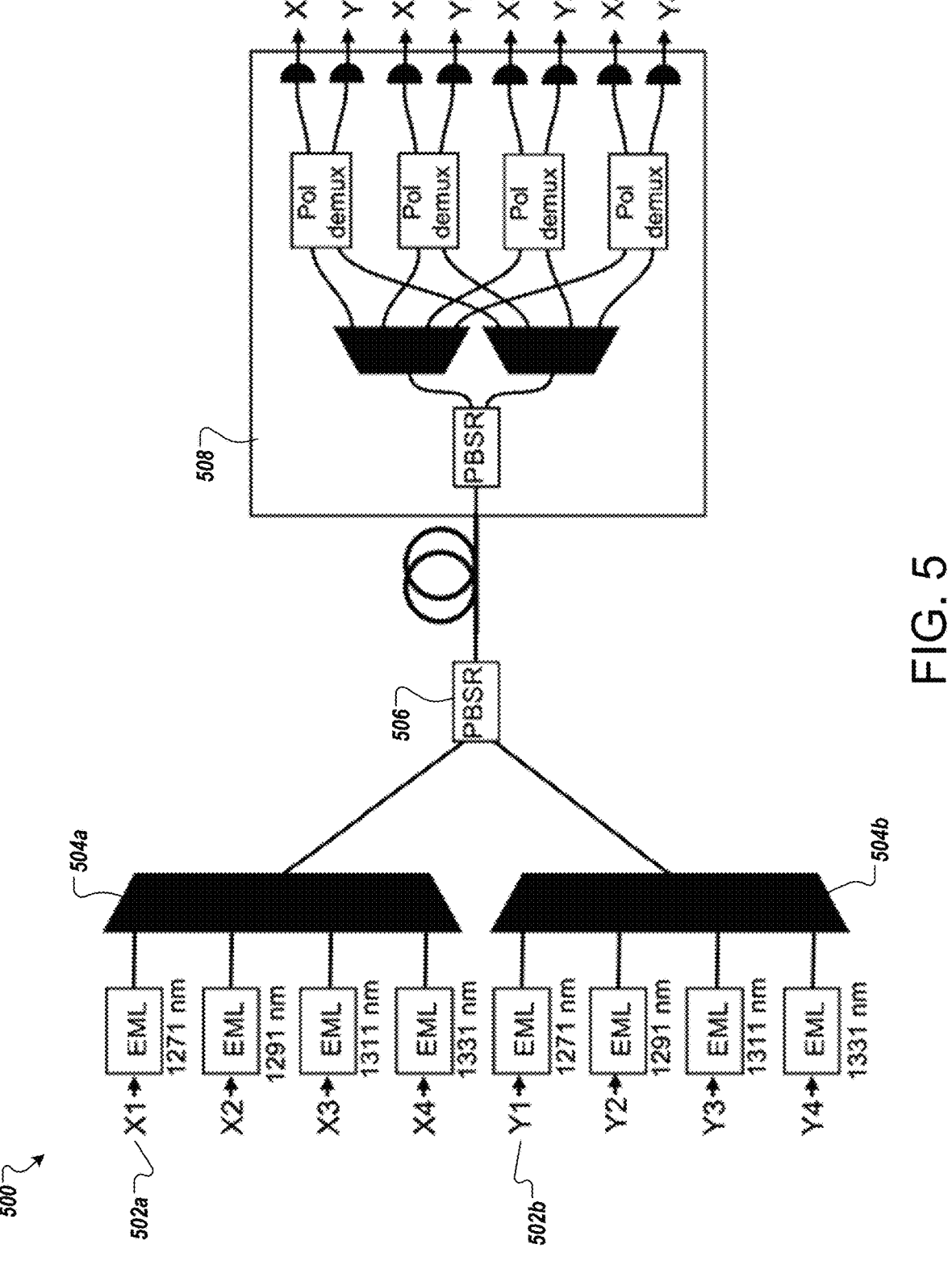
FIG. 5 illustrates an example of a multi-wavelength DP transmitter, according to implementations of the present disclosure.

FIG. 5 shows an example of an optical communication system implementing a wavelength-division-multiplexed (WDM) version of a dual-laser EML based DP transmitter 500. In this example, a 4-wavelength dual-laser EML based DP transmitter 500 and a silicon photonic based receiver 508 are shown. At the transmitter 500, two lasers are implemented for each DP set for each wavelength. For example, EMLs 502a and 502b implement a first pair of EMLs that modulate the two polarization modes of a first wavelength $\lambda_1$. As such a total of 8 EMLs are implemented, grouped into 2 groups, where the first group (X1, X2, X3, X4) correspond to the first polarization mode of each of the 4 wavelengths, and the second group (Y1, Y2, Y3, Y4) correspond to the second polarization mode of each of the 4 wavelengths.

Each of the two groups of EMLs generates modulated optical signals which are then input into respective CWDM multiplexers. For example, the outputs of the first group (X1, X2, X3, X4) of EMLs (corresponding to the first polarization mode of each of the 4 wavelengths) are input into a first CWDM multiplexer 504a, and the outputs of the second group (Y1, Y2. Y3, Y4) of EMLs (corresponding to the second polarization mode of each of the 4 wavelengths) are input into a second CWDM multiplexer 504b. The resulting wavelength-multiplexed signals are then input into PBSR 506 which further multiplexes the two polarization modes of the two groups of signals. As a result, the transmitter 500 can implement a combination of both wavelength-multiplexing and polarization-multiplexing.

Figure 6:
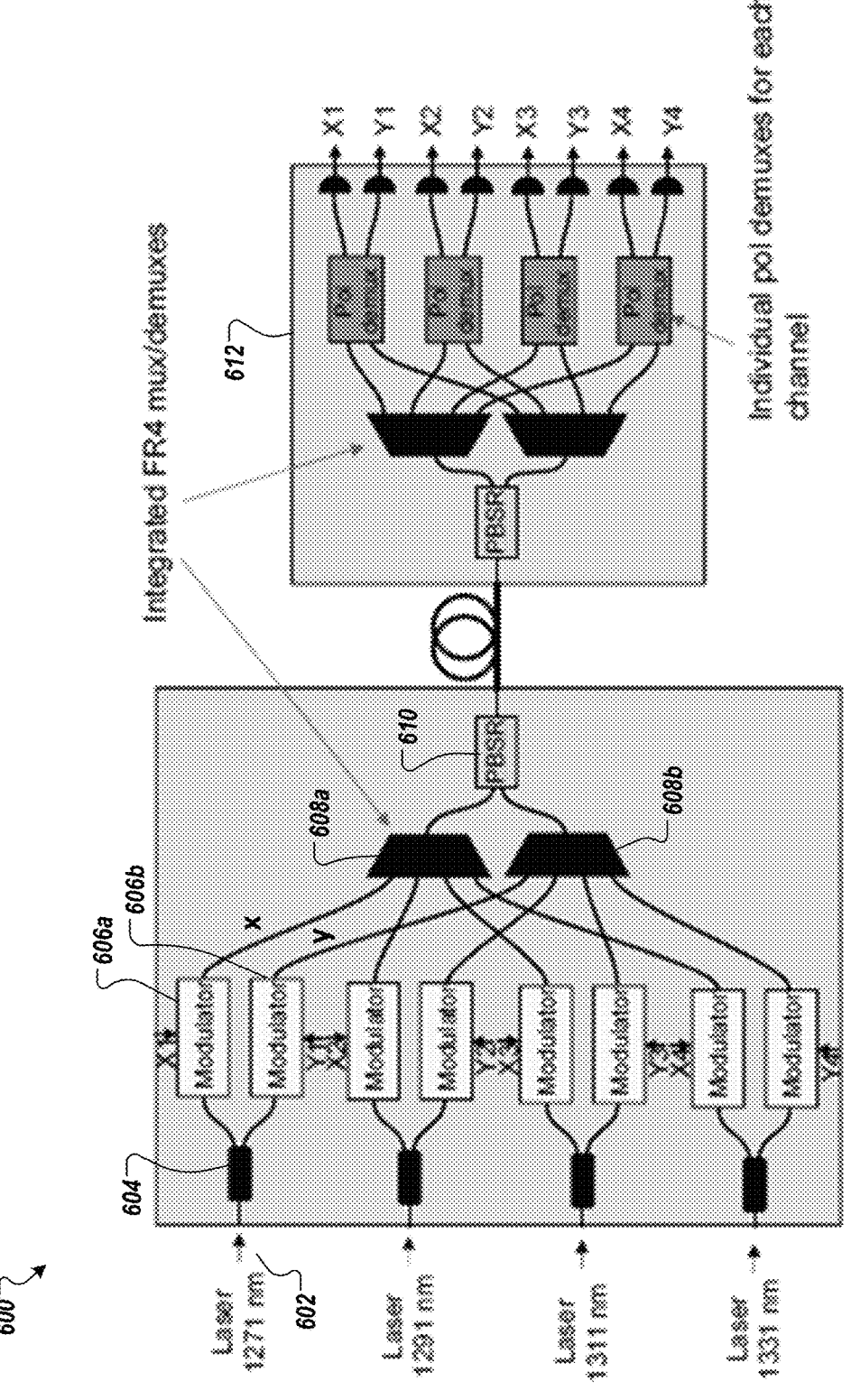
FIG. 6 illustrates another example of a multi-wavelength DP transmitter, according to implementations of the present disclosure.

FIG. 6 shows an example of an optical communication system implementing a silicon photonic based multi-wavelength DP transmitter 600. In this example, a 4-wavelength silicon photonic based DP transmitter 600 and a silicon photonic based receiver 612 are shown. For the first wavelength (e.g., $\lambda_1$=1271 nm), a single CW laser input 602 is split by a splitter 604 into two modulators 606a and 606b which are modulated by respective inputs X1 and Y1. The outputs of the modulators 606a and 606b are modulated optical signals (x and y) in the two polarization modes. Each of the output signals (x and y) are then input into respective CWDM multiplexers 608a and 608b. As such, the modulated signals in the first polarization mode for each of the 4 wavelengths are wavelength-division-multiplexed by the first CWDM multiplexer 608a, and the modulated signals in the second polarization mode for each of the 4 wavelengths are wavelength-division-multiplexed by the second CWDM multiplexer 608b. The resulting wavelength-multiplexed signals which are output from CWDM multiplexers 608a and 608b are then combined in PBSR 610 which further multiplexes the two polarization modes of the two groups of signals for transmission over an optical fiber. As a result, the transmitter 600 can implement a combination of both wavelength-multiplexing and polarization-multiplexing.

The 2×2 MIMO polarization demultiplexers described throughout this disclosure (e.g., 112, 212, and/or 312 in FIGS. 1, 2, and 3) can be implemented in various ways. In some implementations, the 2×2 MIMO polarization demultiplexers have a structure that achieves an "endless" property of demultiplexing, such that the polarization demultiplexing can adapt to random and unpredictable rotations and losses in received polarization, without requiring any resets of the phase-shifting that would interrupt signal reception. Examples of such "endless" polarization demultiplexers are described further below with reference to FIGS. 7 and 8. In some implementations, the 2×2 MIMO polarization demultiplexers include a Stokes measurement apparatus (e.g., instead of using markers) that facilitates the polarization demultiplexing. Examples of such Stokes-assisted polarization demultiplexers are described further below with reference to FIG. 9.

800G-LR4 Optical PMD Based on DP-PAM4

Implementations disclosed herein can be applied to various high-speed communication scenarios. As an example, implementations are applicable to high-speed Ethernet local area, access and metropolitan area networks, such as those based on high-speed IEEE 802 Ethernet standards (e.g., IEEE 802.3x). As a specific example, implementations can be implemented in 800G-LR4 optical Physical Medium Dependent (PMD) systems based on DP-PAM4 for the IEEE 802.3df standard.

Optical MIMO Polarization Demultiplexers

In general, multi-polarization detection is challenging because polarization states tend to drift as an optical waveform travels through a communication system (e.g., due to randomly changing birefringence in fiber transmission lines). Over a long-distance system, these random drifts of polarization can accumulate progressively without limit. In an optical communication system which uses polarization division multiplexing (PDM) to transmit different signals over the two polarization modes of light, the random and unknown polarization drifting creates challenges for a receiver to accurately detect the proper orientation of the two polarization modes, resulting in the two signals becoming mixed at the receiver (sometimes referred to as "crosstalk"). Hence, even though a signal is transmitted in one polarization mode, the signal may actually be received in both polarization modes at the receiver. In addition to polarization drift, other non-idealities in an optical communication system may degrade performance, such as polarization dependent loss (PDL), which amplifies or attenuates different polarization modes differently. To compensate for polarization drift and other non-idealities, a multi-polarization receiver performs adaptive MIMO demultiplexing to separate and unmix the signals that are transmitted in the two polarization modes.

Figure 7:
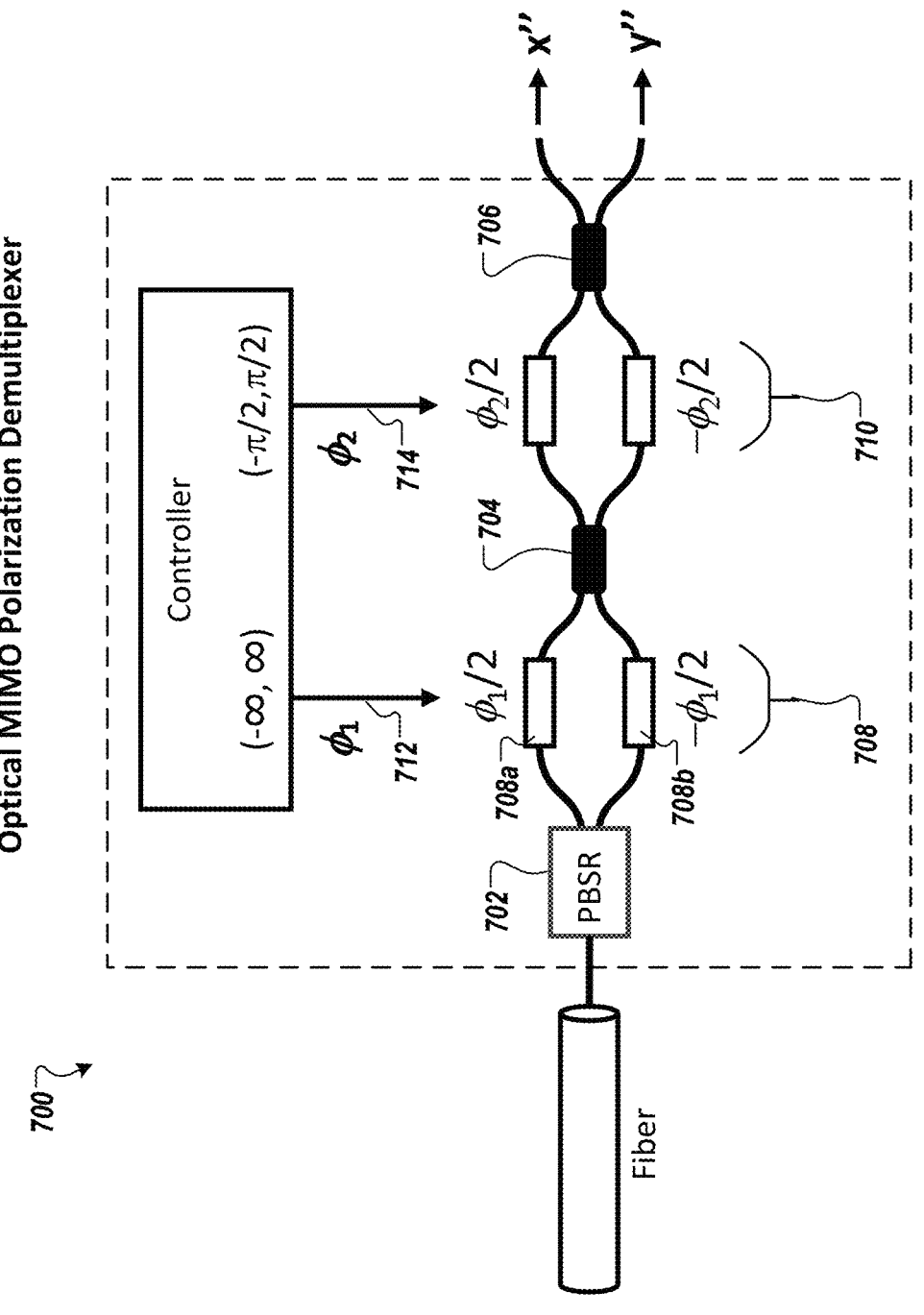
FIG. 7 illustrates an example of an optical MIMO polarization demultiplexer.
Figure 8:
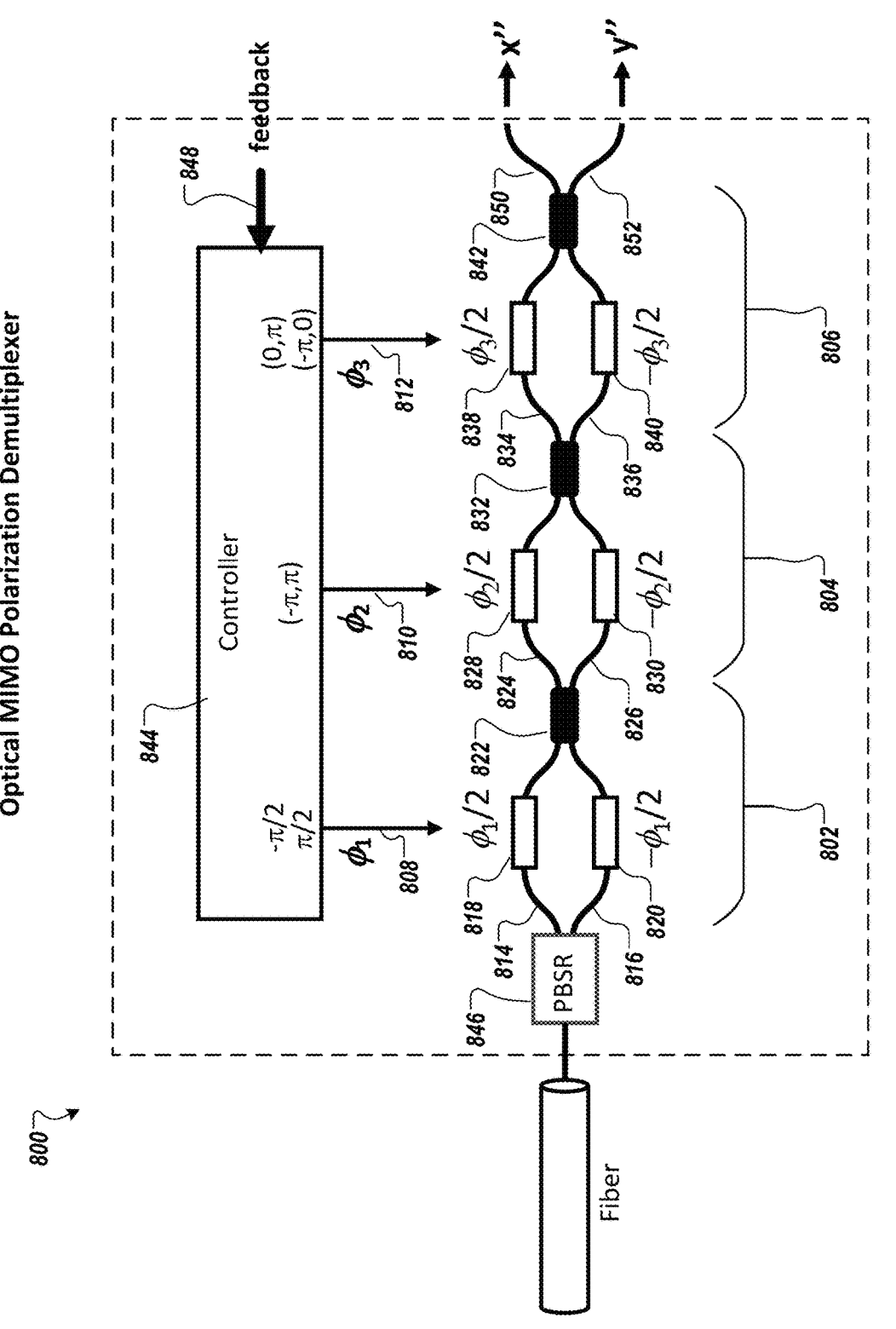
FIG. 8 illustrates another example of an optical MIMO polarization demultiplexer.

FIGS. 7 and 8 illustrate examples of 2×2 MIMO polarization demultiplexers that can be implemented in optical receivers described throughout this disclosure.

FIG. 7 illustrates an example of an optical MIMO polarization demultiplexer with two control signals. Demultiplexer 700 consists of a polarization splitter and rotator (PBSR) 702, two 50/50 couplers 704 and 706, and two phase shifters 708 and 710 (e.g., differential phase shifters). The two phase shifters 708 and 710 are controlled by separate control signals $\varphi_1$ (712) and $\varphi_2$ (714). In the example of FIG. 7, each of the phase shifters 708 and 710 is a differential phase shifter. For example, phase shifter 708 is implemented as an interferometer with two individual phase shifting elements (708*a* and 708*b*) that adjust the optical phase in one direction in one arm of the interferometer and adjusts the optical phase in the opposite direction in the other arm. A similar structure is shown for phase shifter 710. Alternatively, in some implementations, each of the phase shifters 708 and 710 can be implemented as a non-differential phase shifter with just one phase shifting element in a single arm. The differential implementations shown in FIG. 7 has several advantages over a non-differential implementations. For example, the differential implementation has an advantage of requiring a smaller range per phase shifter. Furthermore, for a thermo-optic phase shifter, a differential phase shifter has half the worst-case power consumption as compared to a single phase shifter, and also has the benefit of constant total power consumption, which mitigates thermal transients. For purposes of this disclosure, a differential phase shifter (e.g., phase shifter 708) is considered as one phase shifter, with the understanding that it is implemented with two phase shifters (e.g., phase shifting elements 708*a* and 708*b*) but one control signal (e.g., $\varphi_1$, 712).

With this structure, the demultiplexer 700 can be represented as a matrix D (using the Mueller notation for polarization).

$$D = \begin{bmatrix} j\sin\dfrac{\phi_2}{2} & j\cos\dfrac{\phi_2}{2} \\ j\cos\dfrac{\phi_2}{2} & -j\sin\dfrac{\phi_2}{2} \end{bmatrix} \begin{bmatrix} e^{\frac{j\phi_1}{2}} & 0 \\ 0 & e^{\frac{-j\phi_1}{2}} \end{bmatrix}$$

However, the configuration of optical demultiplexer 700 in FIG. 7 has a limitation in that if the randomly drifting phase caused by the optical fiber requires that the phase control $\varphi_1$ (712) continuously increases, then at some point, due to the input limitations on $\varphi_1$, the phase shifter 708 must be reduced by $2\pi$ (so-called "reset"). However, during this reset, the reception of signals must be interrupted, resulting in possible loss of data and a potentially significant error burst in high-rate communications. To address this problem, a demultiplexer can implement more than two stages of phase shifters.

FIG. 8 illustrates another example of an optical MIMO polarization demultiplexer. The demultiplexer 800 can be implemented as part of a direct detection receiver. In some implementations, demultiplexer 800 is implemented via integrated photonics which can reduce cost compared to bulk optics.

The demultiplexer 800 includes three stages (802, 804, and 806) of phase shifting. Each stage is controlled by a phase shift control signal. For example, the first stage 802 is controlled by a first control signal 808, the second stage 804 is controlled by a second control signal 810, and the third stage 806 is controlled by a third control signal 812. Each control signal controls the amount of phase shift that is implemented in the respective phase shifting stage.

In the example of FIG. 8, each stage has a phase shifter and a 2×2 coupler that operate on a pair of optical transmission paths. For example, the first stage 802 has pair of transmission paths 814 and 816, optical phase shifting elements 818 and 820 (together forming a differential phase shifter), and a 2×2 coupler 822. Similarly, the second stage 804 has a pair of transmission paths 824 and 826, optical phase shifting elements 828 and 830 (together forming a differential phase shifter), and a 2×2 coupler 832. Finally, the third stage 806 has a pair of transmission paths 834 and 836, optical phase shifting elements 838 and 840 (together forming a differential phase shifter), and a 2×2 coupler 842. The 2×2 couplers in this disclosure can be, for example, implemented by directional couplers, multi-mode interference couplers, or adiabatic couplers.

Although the example of FIG. 8 shows differential implementations of phase shifters, some implementations may use non-differential implementations with just one optical phase shifting element (in one transmission path) in a stage. Throughout this disclosure, the phase difference between the two optical transmission paths (in a stage) is referred to simply as "$\varphi$," regardless of whether the phase shift is implemented by a differential phase shifter (i.e., each phase shifting element in the differential pair designed to shift by +/− $\varphi/2$, as shown in the example of FIG. 8) or implemented by a non-differential phase shifter (which shifts the phase of light in just one transmission path by an amount +/− $\varphi$ relative to light in the other transmission path). As such, the term "phase shifter" can apply to a differential phase shifter or to a non-differential phase shifter.

The phase shifters can be thermo-optic (thermo-optic phase shifter, TOPS), electro-optic (electro-optic phase shifter, EOPS), or other types. The TOPS generally have the slowest response time but can be sped up by covering with metal and/or shortening the distance to the heat sink. The power consumption of the TOPS can be reduced by having the optical transmission path pass through the heated region multiple times. The EOPS can operate on, for example, current injection, carrier depletion, or the Pockels effect. Each phase shifter could consist of multiple sections, such as a section with a phase shifter type that has a fast response time but more power consumption and a section with a phase shifter type that has a slow response time but reduced power consumption.

The three stages (802, 804, 806) of demultiplexer 800 are controlled within specific ranges or values of operations in a coordinated manner, so as to ensure that the demultiplexer 800 can achieve an "endless" property of demultiplexing without requiring a reset of any of the phase shifters. In particular, in the example of FIG. 8, the first control signal $\varphi_1$ for the first stage 802 is digital, with a value of either $-\pi/2$ or $+\pi/2$. The second control signal $\varphi_2$ for the second stage 804 can be analog or digital, operating over a continuous or discrete set of values between $-\pi$ and $+\pi$ The third control signal $\varphi_3$ for the third stage 806 can be analog or digital, operating over a continuous or discrete set of values within a range that depends on the first control signal $\varphi_1$, namely operating between 0 and $+\pi$ when $\varphi_1$ is $-\pi/2$ and operating between $-\pi$ and 0 when $\varphi_1$ is $+\pi/2$.

During operation of the demultiplexer 800, light that has traveled through a fiber first enters the splitter, such as PBSR 846, which splits the input light into the two optical transmission paths 814 and 816. The PB SR splits the input light into two polarizations and rotates one of the polarizations so that both outputs of the PBSR are in the same polarization. Thus, although path 814 contains light that was in one polarization when it entered the PBSR and path 816 contains light that was in the orthogonal polarization when it entered the PBSR, once in paths 814 and 816, the light in both paths 814 and 816 are in the same polarization. Although the example of FIG. 8 shows the splitter implemented by PBSR 846, other types of splitters can be used, including passive photonic integrated devices such as a polarization splitting grating coupler (PSGC).

The split input light enters the two optical transmission paths 814 and 816 of the first stage 802 and undergo relative phase shifts through phase shifting elements 818 and 820, such that light in one optical transmission path is phase-shifted by an amount $\varphi_1$ relative to light in the other optical transmission path. The amount of this relative phase shift $\varphi_1$ is controlled by the control signal 808. The phase-shifted light in the two optical transmission paths then enter a 2×2 coupler 822 which combines the relative phase-shifted light. This process repeats through the second stage 804 and the third stage 806, undergoing different phase shifts controlled by control signals $\varphi_2$ (810) and $\varphi_3$ (812).

A controller 844 controls the amount of relative phase shift in the three stages 802, 804, and 806 via the control signals 808, 810, and 812. In scenarios of closed-loop feedback, this control can be based on feedback information 848 which can be, for example, a measurement of an error in the received signal. Although FIG. 8 shows the controller 844 as part of the demultiplexer 800, in some implementations, the controller 844 may be implemented separately in a receiver.

An example of a specific algorithm that can be used by the controller 844 for controlling and coordinating the control signals 808, 810, and 812 will be described next. This algorithm can be used to control relative phase shifts in the demultiplexer 800.

First, light is received through a pair of MIMO inputs into a first pair of optical transmission paths (814, 816). A first optical phase shifter (e.g., differential phase shifter formed by 818 and 820) is controlled to apply a first relative phase shift between the first pair of optical transmission paths (814, 816). In some implementations, the first optical phase shifter can be controlled in a binary manner, for example with values $(c+\pi/2)$ and $(c-\pi/2)$, where "c" is a real number reflecting an offset. This control can be based on feedback information (e.g., using pilot tones).

Then, the first pair of optical transmission paths (814, 816) is combined with a first 2×2 optical coupler (822) to output a second pair of optical transmission paths (824, 826). A second optical phase shifter (e.g., differential phase shifter formed by 828 and 830) is controlled to apply a second relative phase shift between the second pair of optical transmission paths (824, 826). In some implementations, the second optical phase shifter can be controlled within a finite range of values that includes $-n\pi$ and $+n\pi$, where "n" is an integer. For example, this can be by analog operation within a range $(-n\pi, +n\pi)$. This control can be based on feedback information (e.g., using pilot tones).

Then, the second pair of optical transmission paths (824, 826) is combined with a second 2×2 optical coupler (832) to output a third pair of optical transmission paths (834, 836). A third optical phase shifter (e.g., differential phase shifter formed by 838 and 840) is controlled to apply a third relative phase shift between the third pair of optical transmission paths (834, 836). In some implementations, the third optical phase shifter can be controlled within a finite range that depends on the value of the first relative phase shift. For example, as described above, the third optical phase shifter can be controlled to operate between 0 and $+n\pi$ if the first relative phase shift is equal to $(c-\pi/2)$, and to operate between $-n\pi$ and 0 if the first relative phase shift is equal to $(c+\pi/2)$, where "n" is an integer. This can be done by analog operation within the ranges $(0, +n\pi)$ and $(-n\pi, 0)$. This control can be based on feedback information (e.g., using pilot tones).

Then, the third pair of optical transmission paths (834, 836) is combined with a third 2×2 optical coupler (842) to output a fourth pair of optical transmission paths (850, 852). The fourth pair of optical transmission paths (850, 852) is then output through a pair of MIMO outputs 350.

Although this algorithm was described as a specific ordering of steps, one or more of these steps can be performed in a different order. For example, the control of the first, second, and third optical phase shifters can be performed in a different order.

Through such phase-shifting algorithms, demultiplexer 800 is able to compensate for random birefringence changes which rotate the polarizations of light, caused by distortions introduced by the optical communication system. In addition to compensating for phase shifts, a demultiplexer can also be designed to compensate for other non-idealities, such as polarization dependent loss (PDL). In general, PDL may be caused by the fiber line itself, or by other elements of the communication system, such as fiber connectors, isolators, amplifiers, splitters, fiber couplers, or PBSRs. While PDL may be negligible in most short fiber-optic links, as the length of the fiber increases, PDL can have a more substantial impact on proper reception of the optical signals.

Stokes Vector Assisted Polarization Demultiplexing

Figure 9:
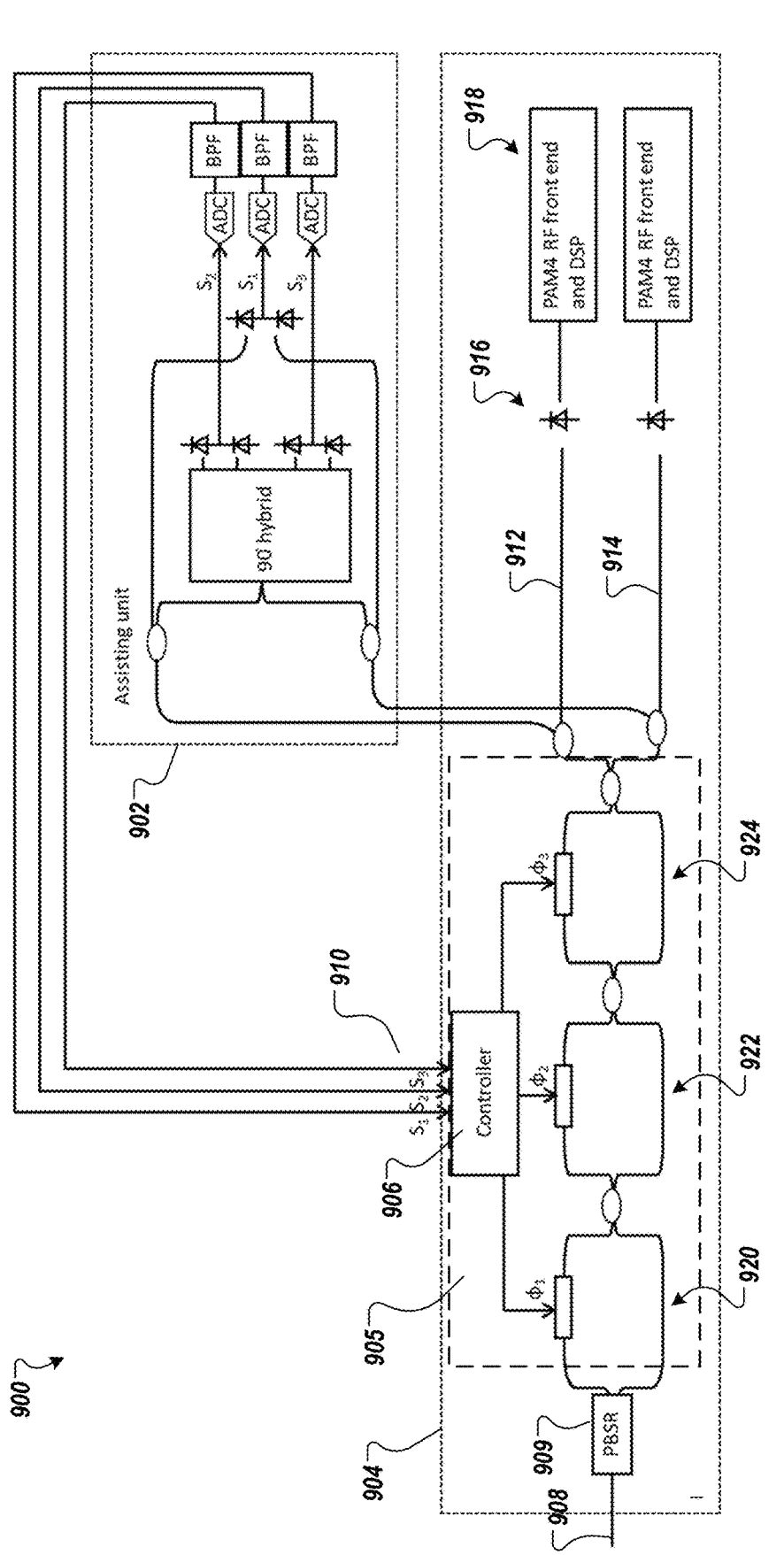
FIG. 9 illustrates an example of Stokes vector assisted optical polarization MIMO demultiplexing, according to implementations of the present disclosure.

FIG. 9 illustrates an example of Stokes vector assisted optical polarization MIMO demultiplexing for an IM-DD system.

In the example optical receiver 900 of FIG. 9, Stokes measurement apparatus 902 is implemented based on integrated optical hybrid and balanced PD to extract Stokes parameters ($S_1$, $S_2$, $S_3$) from an optical waveform. However, other implementations of Stokes measurement apparatus 902 can be used, such as a single-end PD implementation. The extracted Stokes parameters ($S_1$, $S_2$, $S_3$) are provided as an electrical signal 910 to a main path which is implemented by an IMDD receiver 904. In particular, the electrical signal 910 can be provided to a controller 906 of an integrated MIMO polarization demultiplexer 905 in a feedback manner. In some implementations, the bandwidth of the electrical signal 910 received from the Stokes measurement apparatus 902 is smaller than an analog bandwidth of the demultiplexed output light signals that are output from the output ports 912 and 914 of the MIMO polarization demultiplexer 905. Although the example of FIG. 9 shows a feedback structure in which the Stokes measurement apparatus 902 measures the Stokes parameters ($S_1$, $S_2$, $S_3$) from an optical output of the MIMO demultiplexer 905, in some implementations a feedforward structure can be implemented in which the Stokes measurement apparatus 902 measures the Stokes parameters ($S_1$, $S_2$, $S_3$) from an optical input of the optical MIMO demultiplexer 905.

In the example of FIG. 9, the controller 906 controls the integrated MIMO polarization demultiplexer 905 to perform optical polarization MIMO demultiplexing on the input light that is received through input port 908 to generate two demultiplexed output light signals that are output through output ports 912 and 914. The demultiplexed output light signals that are output through output ports 912 and 914 are then detected by photodiodes 916 to yield electrical signals which are processed by receiver circuitry 918, which can perform demodulation and various digital signal processing (DSP) operations to recover the transmitted data.

In some implementations, the Stokes measurement apparatus 902 and the MIMO polarization demultiplexer 905 share a polarization beam-splitter rotator (PBSR) 909 which splits the input light into two transmission paths. In this example, the integrated MIMO polarization demultiplexer 905 implements a 3-stage optical polarization MIMO demultiplexing structure that adaptively performs 3-stage relative phase shifting of light in the two transmission paths. Details of the 3-stage optical polarization MIMO demultiplexing structure will be described further below with reference to FIG. 8. Each of the 3 stages (920, 922, and 924) has two optical transmission paths (e.g., an upper transmission path and a lower transmission path in FIG. 9), with one phase shifter implemented in one of the optical transmission paths (or with two phase shifters implemented in push-pull configuration in both optical transmission paths) and a 2×2 coupler that combines the two optical transmission paths for the next stage. In each stage, the phase shifter controls the relative phase difference between the two optical transmission paths in that stage. Thus, the values of the three phase differences (denoted $\phi_1$, $\phi_2$ or $\phi_3$ in FIG. 9) in the three stages are applied by the corresponding phase shifter in each stage. The phase shifters can be implemented using thermo-optic (thermo-optic phase shifter, TOPS), electro-optic (electro-optic phase shifter, EOPS), or other types of phase shifters. Further details of the 3-stage phase shifting MIMO polarization demultiplexer are provided below with reference to FIG. 8.

The three phase shifters of FIG. 9 are controlled by controller 906, which determines how much phase shift ($\phi_1$, $\phi_2$, $\phi_3$) to apply in the three phase shifting stages. In some implementations, the first phase shifter value, $\phi_1$, is a digital control, being either $-\pi/2$ or $\pi/2$. The second and third phase shifter values, $\phi_2$, and $\phi_3$, can be analog controls. The operation of the controller 906 can take two factors into account: (1) fast calculating the second and third phase shifts, $\phi_2$ and $\phi_3$, based on measured Stokes parameters 910 extracted by Stokes measurement apparatus 902 from the optical outputs (912 and 914) of the demultiplexer 905, and (2) continuous demultiplexing when one of phase shifters reaches the end of its range, the so-called "endless" property of demultiplexing as described with reference to FIG. 8 below.

As a solution of factor (1), the second phase shift $\phi_2$ is calculated so as to make the three vectors $\hat{S}_n$, $\langle \hat{S} \rangle$, and $\hat{S}_3$ to be coplanar in Stokes space. The analytical expression of the coplanar condition is given by Equation 4:

$$\hat{S}_n \cdot (\langle \hat{S} \rangle \times \hat{S}_3) = 0 \qquad \text{Eq. 4}$$

where $$\hat{S}_n = T \times \hat{S}_n(0)$$

$$\langle \hat{S} \rangle = T \times \langle \overrightarrow{S(0)} \rangle$$

where $\hat{S}_n(0)$ and $\langle \overrightarrow{S(0)} \rangle$ are the initial values of $\hat{S}_n$ and $\langle \hat{S} \rangle$. And rotation matrix T and T' are denoted by $$T = R_{S3}^{-1} \times R_{S1} \times R_{S3}$$

$$T' = D^{-1} \times R_{S3}^{-1} \times R_{S1} \times R_{S3} \times D$$

where $$D = \begin{bmatrix} 1 & 0 & 0 & -\langle S_1(0) \rangle \\ 0 & 1 & 0 & -\langle S_2(0) \rangle \\ 0 & 0 & 1 & -\langle S_3(0) \rangle \\ 0 & 0 & 0 & 1 \end{bmatrix}$$

$$R_{S3} = \begin{bmatrix} \cos(\phi_3(0)) & -\sin(\phi_3(0)) & 0 & 0 \\ \sin(\phi_3(0)) & \cos(\phi_3(0)) & 0 & 0 \\ 0 & 0 & 1 & 0 \\ 0 & 0 & 0 & 1 \end{bmatrix}$$

$$R_{S1} = \begin{bmatrix} 1 & 0 & 0 & 0 \\ 0 & \cos(\phi_2) & -\sin(\phi_2) & 0 \\ 0 & \sin(\phi_2) & \cos(\phi_2) & 0 \\ 0 & 0 & 0 & 1 \end{bmatrix}$$

As a result of Equation 4, the desired second phase shift value, $\phi_{2,opt}$, is determined by:

$$f(\sin(\phi_{2,opt}), \cos(\phi_{2,opt})) = 0 \qquad \text{Eq. 5}$$

where f ($\cdot$) is a linear function with known parameters of $S_1(0)$, $S_2(0)$, $S_3(0)$, and $\phi_3(0)$ In some implementations, the solution $\phi_{2,opt}$ of Equation 5 can be implemented by a pre-calculated look-up table (LUT), or can be implemented using fast analytical approximation techniques.

Next, the third phase shift value $\phi_3$ is calculated to make $\langle S_1 \rangle = 0$. The desired third phase shifter value, $\phi_{3,opt}$, can be determined by:

$$\cos(\phi_{3,opt}) \cdot \langle S_2(0) \rangle' - \sin(\phi_{3,opt}) \langle S_1(0) \rangle' = 0 \qquad \text{Eq. 6}$$

where $S_1(0)'$ and $S_2(0)'$ are initial Stokes vector elements after the second phase shift $\phi_2$ adjustment.

Therefore, by solving Equation 5 and Equation 6, the demultiplexer output can meet the demultiplexing condition. In some implementations, solving the desired second and third phase values $\phi_{2,opt}$ and $\phi_{3,opt}$ analytically can provide a significant advantage because the Stokes parameters only need to be acquired once, which can greatly simplify the demultiplexing process and accelerate tracking speed. In some implementations, a progressive search algorithm can be used to solve for the desired second and third phase values $\phi_{2,opt}$ and $\phi_{3,opt}$, but in some scenarios this can require multiple acquisitions of the Stokes parameters which could result in more complexity and slow down tracking speed.

Due to the cyclical and periodic nature of phase, Equation 5 and Equation 6 have multiple solutions. For the second phase shift, the desired value $\phi_{2,opt}$ has a solution period of $2\pi$. For the third phase shift, the desired value $\phi_{3,opt}$ has a solution period of $\pi$. Taking into account the factor of endless demultiplexing control (factor 2 discussed above), the desired value of the second phase shift, $\phi'_{2,opt}$, can be selected from the multiple solutions, being limited in a practical operation range of $[-\pi, \pi]$. The desired value of the third phase shift, $\phi'_{3,opt}$, can be selected from the multiple solutions, being limited in the operation range of $[-\pi, 0]$ when the first phase shift value is $\phi_1=\pi/2$ and in the operation range of $[0, \pi]$ when $\phi_1=-\pi/2$. Further details of endless demultiplexing control are discussed with reference to FIG. 8, below.

In some implementations, the bandwidth of the Stokes measurement apparatus (e.g., Stokes measurement apparatus 902 in FIG. 9) can be configured by balancing the Stokes vector signal-to-noise-ratio (SNR) and hardware complexity. For example, to increase Stokes vector SNR and/or avoid ambiguity, an overhead or a pilot tone can be included in the data stream to enhance low frequency strength. In some implementations, a radio-frequency (RF) bandpass filter (BPF) can be implemented as shown in FIG. 9 to select a particular signal band and to filter out noise. However, implementations of the present disclosure are not limited to implementing an overhead, a pilot tone, or a bandpass filter. In some implementations, any one or more (or none) of an overhead, a pilot tone, and/or bandpass filter schemes can be used.

While this disclosure contains many specific implementation details, these should not be construed as limitations on the scope of any invention or of what may be claimed, but rather as descriptions of features that may be specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results.

What is claimed is:

1. A multi-wavelength dual-polarization (DP) receiver comprising:

an input port configured to receive input light;

an optical polarization splitter and rotator configured to split the input light into a first optical waveguide and a second optical waveguide;

a first wavelength demultiplexer connected to the first optical waveguide and configured to output wavelength-demultiplexed light into a first plurality of optical waveguides;

a second wavelength demultiplexer connected to the second optical waveguide and configured to output wavelength-demultiplexed light into a second plurality of optical waveguides;

a plurality of optical multi-input-multi-output (MIMO) polarization demultiplexers, each of which is connected to a respective one of the first plurality of optical waveguides and one of the second plurality of optical waveguides; and circuitry configured to detect, from a first output and a second output of each of the plurality of MIMO polarization demultiplexers, a first modulated signal and a second modulated signal, respectively.

2. The multi-wavelength DP receiver of claim 1, further comprising at least one variable optical attenuator (VOA) connected to at least one output of at least one of the first wavelength demultiplexer or the second wavelength demultiplexer, wherein the at least one VOA is configured to equalize a loss between light provided through the first optical waveguide and light provided through the second optical waveguide.

3. The multi-wavelength DP receiver of claim 1, wherein the optical polarization splitter and rotator, the first and second wavelength demultiplexers, and the plurality of optical MIMO polarization demultiplexers are all implemented on the same chip.

4. The multi-wavelength DP receiver of claim 3, wherein the chip has a silicon substrate.

5. The multi-wavelength DP receiver of claim 3, further comprising a transimpedance amplifier that is integrated into the chip.

6. The multi-wavelength DP receiver of claim 3, wherein electronic control for the plurality of optical MIMO polarization demultiplexers is integrated into the chip.

7. The multi-wavelength DP receiver of claim 3, further comprising a Stokes measurement apparatus that is integrated on the same chip.

8. The multi-wavelength DP receiver of claim 1, wherein the first wavelength demultiplexer and the second wavelength demultiplexer are each configured to output demultiplexed light having a plurality of wavelengths into the first plurality of optical waveguides and the second plurality of optical waveguides, respectively, and wherein, for each wavelength of the plurality of wavelengths, a path length from the first wavelength demultiplexer to a first input input of a MIMO polarization demultiplexer, of the plurality of optical MIMO polarization demultiplexers, that receives light having the wavelength is within 0.2 mm of a path length from the second wavelength demultiplexer to a second input of the MIMO polarization demultiplexer.

9. The multi-wavelength DP receiver of claim 1, wherein the multi-wavelength DP receiver is co-packaged with a digital-signal processor.

10. The multi-wavelength DP receiver of claim 1, further comprising taps and monitor photodiodes that are implemented on outputs of at least one of the plurality of optical MIMO polarization demultiplexers.

11. The multi-wavelength DP receiver of claim 1, wherein the first and second wavelength demultiplexers have wavelengths that are electronically adjustable.

12. The multi-wavelength DP receiver of claim 1, wherein the first wavelength demultiplexer outputs a first plurality of wavelength-demultiplexed light signals of N wavelengths into the first plurality of optical waveguides, wherein the second wavelength demultiplexer outputs a second plurality of wavelength-demultiplexed light signals of the N wavelengths into the second plurality of optical waveguides, and wherein an ordering of the N wavelengths for the first plurality of wavelength-demultiplexed light signals that are output from the first wavelength demultiplexer and an ordering of the N wavelengths for the second plurality of wavelength-demultiplexed light signals that are output from the second wavelength demultiplexer are in an opposite order.

13. The multi-wavelength DP receiver of claim 12, wherein at least one of the N wavelengths has no waveguide crossings among the first plurality of optical waveguides and the second plurality of optical waveguides between the first and second wavelength demultiplexers and the plurality of MIMO polarization demultiplexers.

14. The multi-wavelength DP receiver of claim 1, wherein the circuitry comprises a plurality of photodetectors connected to respective outputs of the plurality of optical MIMO polarization demultiplexers.

* * * * *